United States Patent
Yang

(10) Patent No.: US 9,376,300 B2
(45) Date of Patent: Jun. 28, 2016

(54) END PIECE OF WHEEL CYLINDER PISTON ADJUSTOR

(71) Applicant: Jen-Yung Yang, Taichung (TW)

(72) Inventor: Jen-Yung Yang, Taichung (TW)

(*) Notice: Subject to any disclaimer, the term of this patent is extended or adjusted under 35 U.S.C. 154(b) by 168 days.

(21) Appl. No.: 14/485,156

(22) Filed: Sep. 12, 2014

(65) Prior Publication Data

US 2016/0075544 A1  Mar. 17, 2016

(51) Int. Cl.
  *B25B 27/00*  (2006.01)
  *B66F 19/00*  (2006.01)
  *F16D 65/00*  (2006.01)

(52) U.S. Cl.
  CPC ............ *B66F 19/00* (2013.01); *F16D 65/0043* (2013.01)

(58) Field of Classification Search
  CPC  B25B 27/00; B25B 27/0035; B25B 27/0042; F16D 65/0043; F16D 65/38; Y10T 403/32549; Y10T 403/32557; Y10T 403/32581; Y10T 403/32591; Y10T 403/32622
  See application file for complete search history.

(56) References Cited

U.S. PATENT DOCUMENTS

| | | | | |
|---|---|---|---|---|
| 611,933 A * | 10/1898 | Peterson | ................. | F16C 11/04 297/249 |
| 1,705,582 A * | 3/1929 | May | ....................... | A61G 15/10 248/316.2 |
| 4,738,252 A * | 4/1988 | Friddle | ................ | A61F 5/0127 403/97 |
| 4,773,404 A * | 9/1988 | Townsend | ............. | A61F 5/0123 602/16 |
| 5,003,681 A * | 4/1991 | Schley | .................... | B25B 13/48 29/239 |
| 5,018,261 A * | 5/1991 | Markous | ............... | B25B 27/023 29/239 |
| 5,542,774 A * | 8/1996 | Hoy | ...................... | A61F 5/0125 403/113 |
| 6,095,017 A * | 8/2000 | Long | ................... | B25B 27/0035 81/176.15 |
| 6,574,846 B1 * | 6/2003 | Kang | .................. | B25B 27/0021 29/239 |
| 7,194,948 B2 * | 3/2007 | Liu | ........................ | F15B 15/202 29/239 |
| 9,174,330 B2 * | 11/2015 | Chen | ................... | B25B 27/0035 |
| 9,309,937 B2 * | 4/2016 | Chen | ................... | F16D 65/0043 |
| 2008/0083070 A1 * | 4/2008 | Huang | ................ | B25B 27/0035 7/100 |
| 2010/0212924 A1 * | 8/2010 | Liu | ..................... | F16D 65/0043 173/218 |
| 2013/0263704 A1 * | 10/2013 | Chen | .................. | B25B 27/0035 81/177.5 |

* cited by examiner

*Primary Examiner* — Joseph J Hail
*Assistant Examiner* — Tyrone V Hall, Jr.
(74) *Attorney, Agent, or Firm* — Guice Patents PLLC

(57) ABSTRACT

An end piece of wheel cylinder piston adjustor includes a seat section and a rock arm. One end of the rock arm is pivotally connected with the seat section via a pivot pin, whereby the rock arm is rotatable around the pivot pin. A locating body is disposed at the other end of the rock arm and extends through a guide slot. When the rock arm is swung, the locating body is driven to synchronously move within the guide slot so as to change the distance between the locating bodies connected with the end of the wheel cylinder piston. The locating bodies can be smoothly moved to facilitate the vehicle service work.

10 Claims, 5 Drawing Sheets

END PIECE OF WHEEL CYLINDER PISTON ADJUSTOR

BACKGROUND OF THE INVENTION

1. Field of the Invention

The present invention relates generally to a vehicle service tool, and more particularly to an end piece of wheel cylinder piston adjustor.

2. Description of the Related Art

It is known that the disc brake of a vehicle includes two brake discs rotatable with the wheels. A brake calipers is used to clamp the brake discs so as to brake the wheel. The rotational speed of the brake discs is slowed down so as to slow down the vehicle or stop the vehicle. Substantially, the brake main cylinder provides fluid pressure through a pipeline to the wheel cylinder of the brake calipers. The piston of the wheel cylinder is axially moved to push the linings connected with the piston. At this time, the linings tightly abut against the faces of the brake discs to apply a frictional force against the move of the brake discs. Under such circumstance, the rotational speed of the wheel is reduced so as to slow down or stop the vehicle.

The braking effect of the disc brake is achieved by means of the frictional force between the linings and the brake discs. Therefore, the wear of the linings is inevitable. After a period of use, the worn linings must be replaced so as to ensure that the brake calipers can provide reliable braking effect to keep safety. In order to facilitate the replacement of the brake linings, various special tools are applicable to different types of brake calipers to help an operator to push the wheel cylinder piston back into the piston room for replacing the worn linings with new ones.

FIG. 1 shows a conventional disc-shaped end piece 1 as a component of the conventional wheel cylinder piston adjustor. The end piece 1 is formed with a central quadrangular hole 2. A drive end of the wheel cylinder piston adjustor is coaxially fitted in the quadrangular hole 2. Locating bolts 3 protruding from one face of the end piece 1 are engaged with the end of the wheel cylinder piston. The locating bolts 3 are positioned between the drive end of the wheel cylinder piston adjustor and the wheel cylinder piston. The conventional wheel cylinder piston adjustor is operated to apply a force to the wheel cylinder piston via the end piece 1 so as to push the wheel cylinder piston back into the piston room.

The end piece 1 has an annular base disc 4 formed with the central quadrangular hole 2. The drive end of the wheel cylinder piston adjustor is coaxially fitted in the quadrangular hole 2. A rotary disc 5 is attached to and connected with the base disc 4. One end of the locating bolts 3 is respectively slidable disposed in the arched slide slots 6 of the rotary disc 5. The other end of the locating bolts 3 is passed through the straight guide slots 7 of the base disc 4. Accordingly, when the rotary disc 5 and the base disc 4 are relatively rotated in the same axial direction, the arched slide slots 6 will drive the locating bolts 3 to move within the guide slots 7 so as to change the distance between the locating bolts 3. In this case, the end piece 1 is applicable to different wheel cylinder pistons with different sizes.

According to the above arrangement, the adjustment of the distance between the locating bolts 3 is achieved by means of the slide of one end of the locating bolts 3 within the corresponding slide slots 6. In this case, after a period of use, the locating bolts 3 and the slide slots 6 are likely to wear due to relative sliding. As a result, the locating bolts 3 are likely to clog and can be hardly smoothly slid. Therefore, in practice, the conventional end piece 1 cannot be conveniently used and needs to be improved.

SUMMARY OF THE INVENTION

It is therefore a primary object of the present invention to provide an end piece of wheel cylinder piston adjustor. The end piece has multiple locating bodies connected with the end of the wheel cylinder piston. The distance between the locating bodies can be adjusted by means of changing the angular position of the rock arms. Therefore, the locating bodies can be smoothly moved to facilitate the service of the vehicle.

To achieve the above and other objects, the end piece of wheel cylinder piston adjustor of the present invention includes a seat section and a rock arm. One end of the rock arm is pivotally connected with the seat section via a pivot pin, whereby the rock arm is rotatable around the pivot pin. A locating body is disposed at the other end of the rock arm and extends through a guide slot. When the rock arm is swung, the locating body is driven to synchronously move within the guide slot so as to change the distance between the locating bodies connected with the end of the wheel cylinder piston.

To speak more specifically, the end piece of wheel cylinder piston adjustor includes: a seat section; a guide section disposed on the seat section, the guide section having a linearly extending guide slot; and a locating section having a pin-shaped locating body extending through the guide slot and a rock arm, one end of the rock arm being connected with the locating body, the other end of the rock arm being pivotally connected with the seat section via a pivot pin, whereby the rock arm is rotatable around the pivot pin to drive the locating body to synchronously move within the guide slot.

In order to apply the end piece to different types of wheel cylinder pistons with different shapes of ends, the number of the locating bodies of the end piece of wheel cylinder piston adjustor is at least two. Accordingly, the end piece of the wheel cylinder piston adjustor is applicable to different wheel cylinder pistons with different sizes.

In the above end piece of wheel cylinder piston adjustor, the number of the guide slots is equal to the number of the locating bodies, whereby the locating bodies are respectively extended through the corresponding guide slots.

In the above end piece of wheel cylinder piston adjustor, the two guide slots are formed on the guide body at an angular interval of 180 degrees.

In the above end piece of wheel cylinder piston adjustor, the number of the rock arms is also equal to the number of the locating bodies. One end of the rock arm is connected with the corresponding locating body, while the other end of the rock arm is pivotally connected with the seat section in different position.

In the above end piece of wheel cylinder piston adjustor, the rock arm is embedded in the seat section so that the rock arm can be smoothly rotated without being obstructed.

In the above end piece of wheel cylinder piston adjustor, the seat section has a move space in which a rotary body is received. The other end of the rock arm is pivotally connected with the rotary body.

In the above end piece of wheel cylinder piston adjustor, the seat section includes a plate-shaped seat body. A plate-shaped guide body is connected with the seat body to define the move space between the seat body and the guide body for rotatably receiving the rotary body therein.

In the above end piece of wheel cylinder piston adjustor, the guide slots are formed on the guide body in communication with the move space.

In the above end piece of wheel cylinder piston adjustor, the rock arm is positioned between the rotary body and the guide body.

In the above end piece of wheel cylinder piston adjustor, the rotary body has the form of a plate body.

In the above end piece of wheel cylinder piston adjustor, the seat section has an engagement hole formed through a curvature center of the rotary body.

The present invention can be best understood through the following description and accompanying drawings, wherein:

DETAILED DESCRIPTION OF THE PREFERRED EMBODIMENTS

Figure 1:
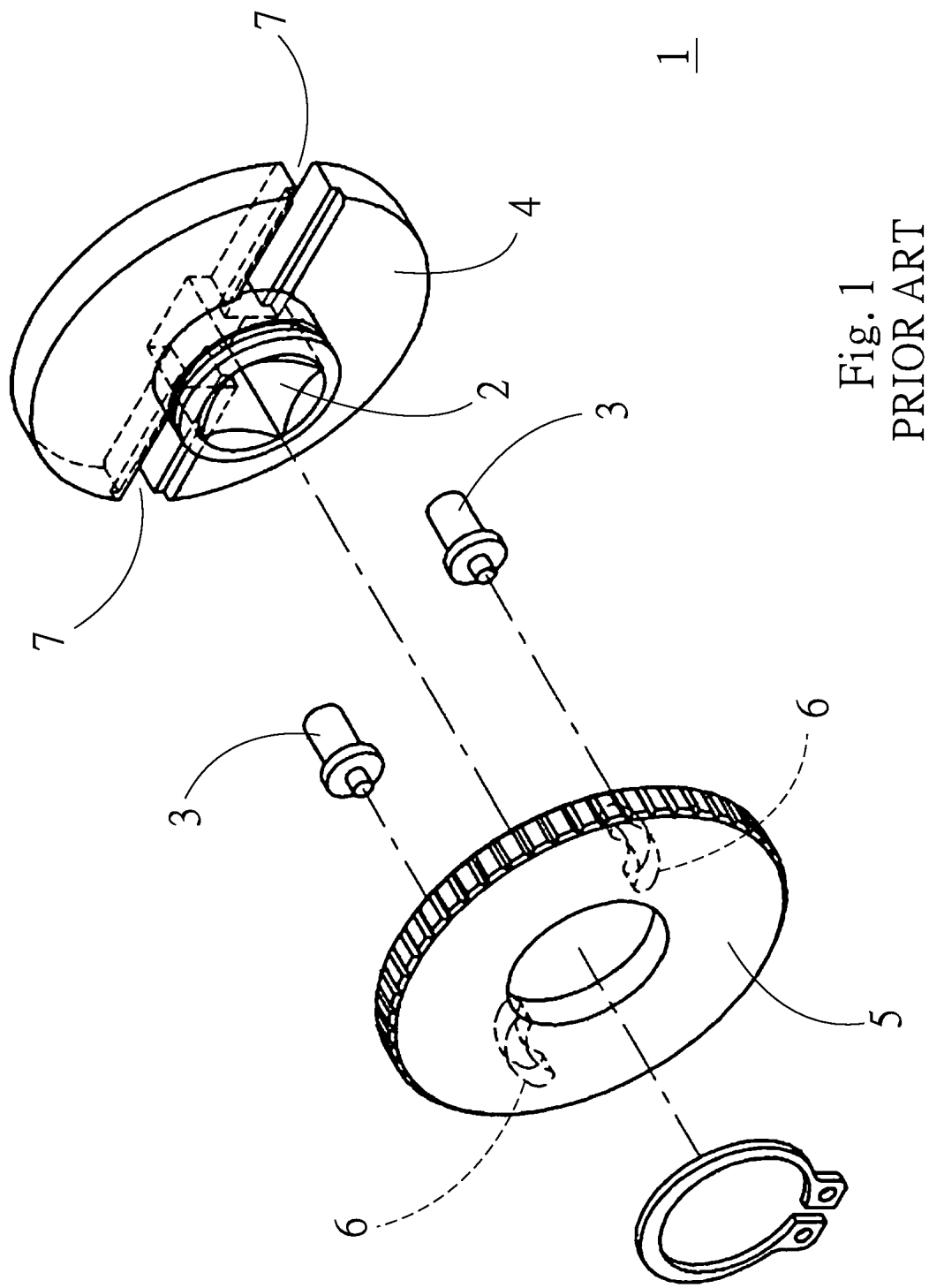
FIG. 1 is a perspective exploded view of a conventional end piece.
Figure 2:
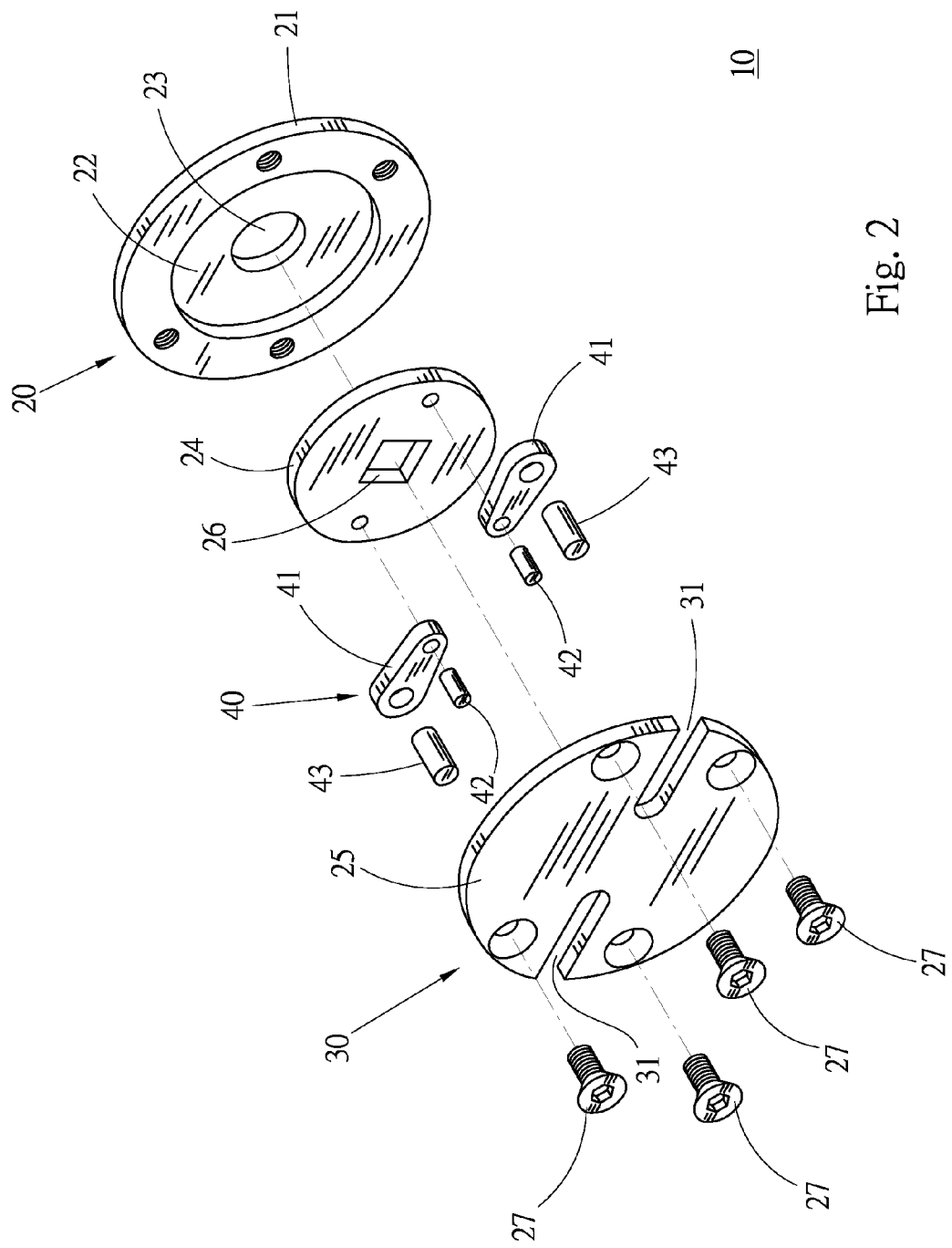
FIG. 2 is a perspective exploded view of a preferred embodiment of the present invention.
Figure 3:
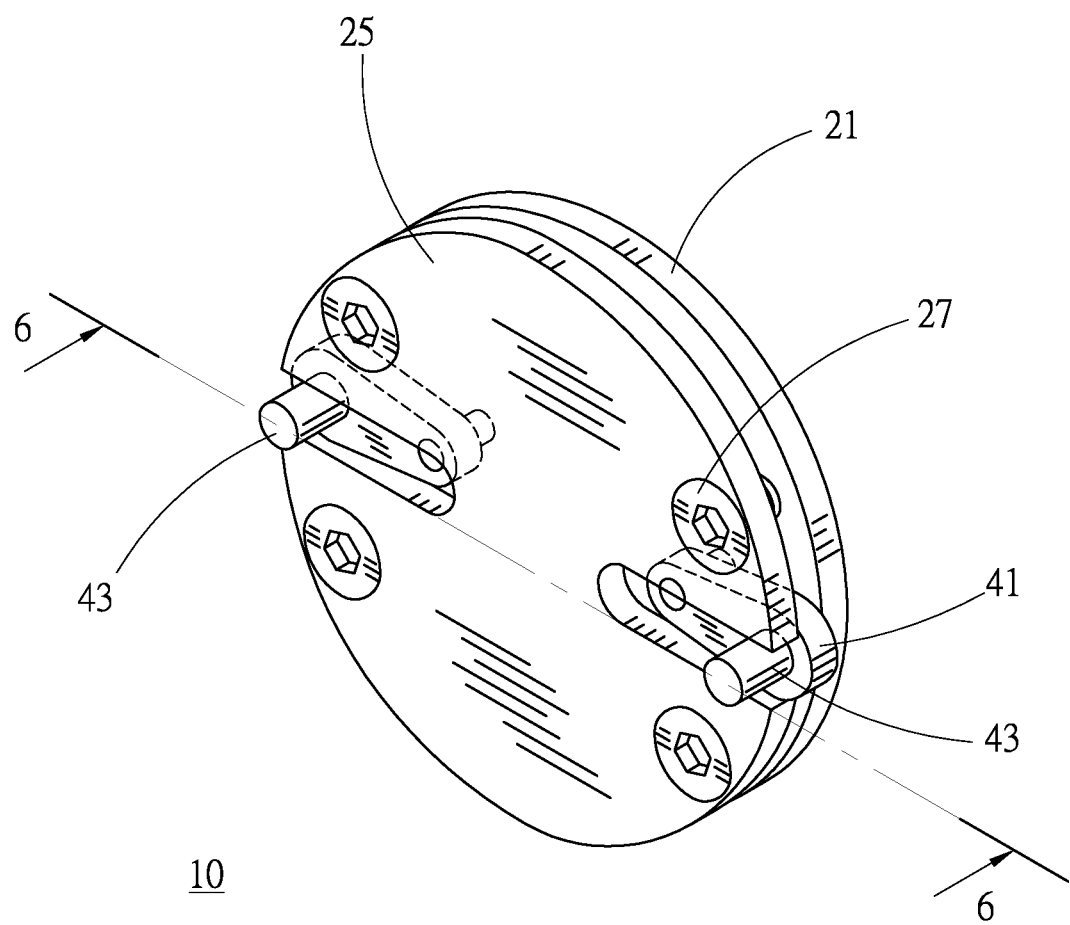
FIG. 3 is a perspective assembled view of the preferred embodiment of the present invention.

Please refer to FIGS. 2 to 6. According to a preferred embodiment, the end piece 10 of wheel cylinder piston adjustor of the present invention is a part of the conventional wheel cylinder piston adjustor. The end piece 10 abuts against the end of the wheel cylinder piston and is driven by the drive end of the wheel cylinder piston adjustor. Accordingly, the action force applied by the wheel cylinder piston adjustor can be transmitted by the end piece 10 to the wheel cylinder piston so as to push the wheel cylinder piston back into the piston room. Substantially, the end piece 10 includes a seat section 20, a guide section 30 and a locating section 40.

The seat section 20 has a plate-shaped seat body 21. A move space 22 in the form of a recess is formed on one face of the seat body 21. A shaft hole 23 is formed through a curvature center of the seat body 21 in communication with the move space 22. A rotary body 24 in the form of a circular plate is freely rotatable received in the move space 22. A plate-shaped guide body 25 is attached to one face of the seat body 21 to block the opening of the move space 22, whereby the rotary body 24 is held and located between the guide body 25 and the seat body 21. A quadrangular engagement hole 26 is formed through the curvature center of the rotary body 24 and coaxial with the shaft hole 23. Multiple connection bolts 27 are respectively screwed on the guide body 25 and the seat body 21 to fixedly connect the guide body 25 with the seat body 21.

The guide section 30 has two guide slots 31. The guide slots 31 are formed on the guide body 25 at an angular interval of 180 degrees. The two guide slots 31 linearly extend by a certain length in communication with the move space 22.

The locating section 40 has two rock arms 41 positioned between the rotary body 24 and the guide body 25. One end of each rock arm 41 is pivotally connected to one face of the rotary body 24 via a pivot pin 42. Accordingly, the rock arms 41 are independently rotatable around the corresponding pivot pins 42. Two pin-shaped locating bodies 43 are respectively passed through the corresponding guide slots 31. One end of the locating body 43 is connected with the other end of the corresponding rock arm 41. The other end of the locating body 43 extends out of the guide body 25 and protrudes from the seat section 20.

Figure 4:
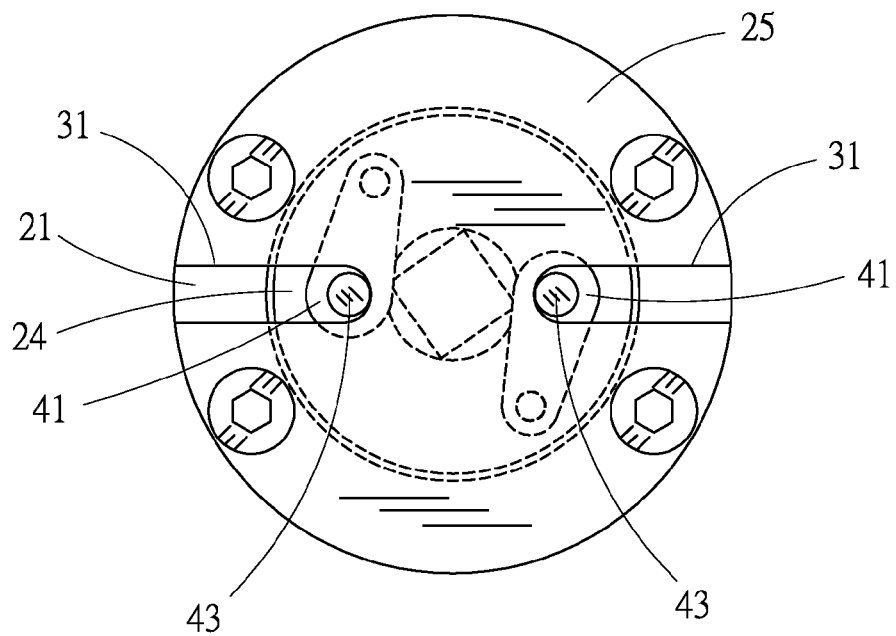
FIG. 4 is a front view of the preferred embodiment of the present invention, showing that the two locating bodies are spaced from each other by a minimum distance.
Figure 5:
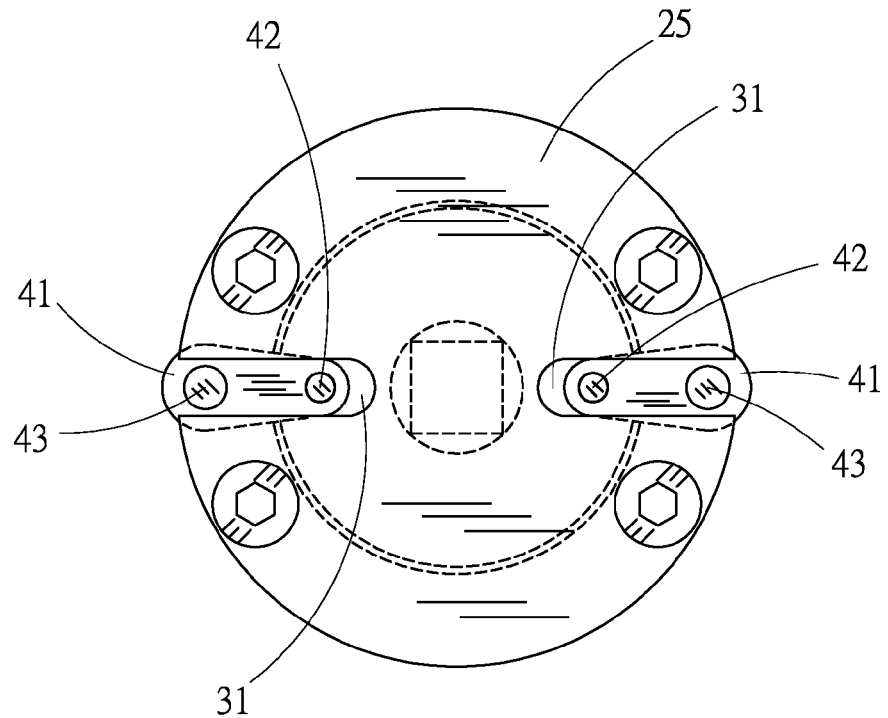
FIG. 5 is a front view of the preferred embodiment of the present invention, showing that the two locating bodies are spaced from each other by a maximum distance.
Figure 6:
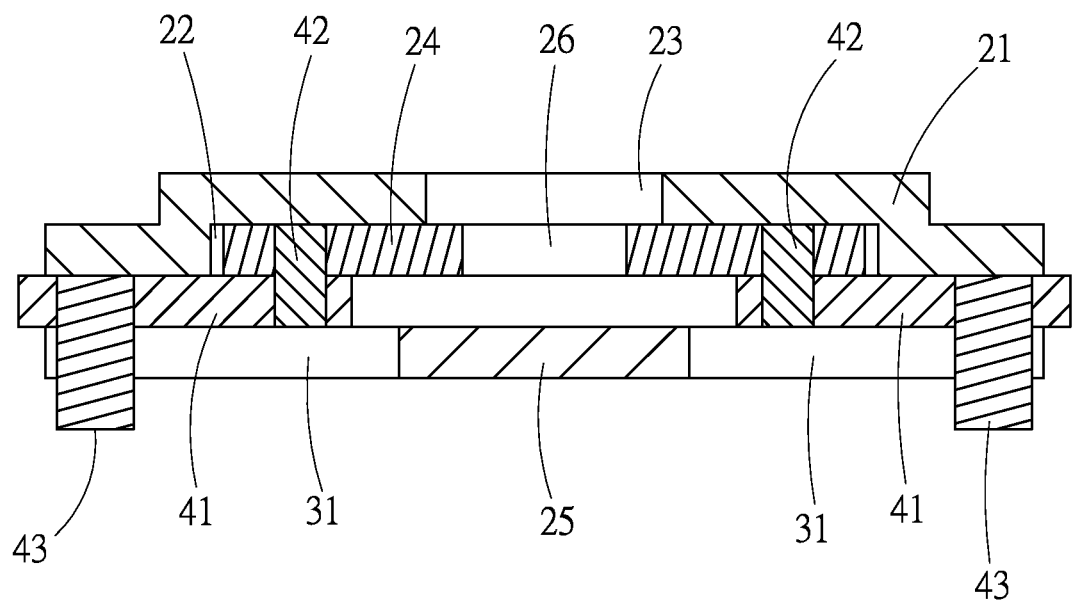
FIG. 6 is a sectional view taken along line 6-6 of FIG. 3.

According to the above arrangement, the rock arms 41 of the end piece 10 of wheel cylinder piston adjustor can be swung to drive the locating bodies 43 to slide within the guide slots 31 as shown in FIGS. 4 and 5. In this case, the distance between the locating bodies 43 is adjustable, whereby the end piece 10 of wheel cylinder piston adjustor is applicable to different end piece 10 of wheel cylinder pistons with different sizes.

One end of each locating body 43 of the end piece 10 of wheel cylinder piston adjustor is connected with the corresponding rock arm 41. Therefore, when adjusting the distance between the locating bodies 43, the move of the locating bodies 43 is achieved by means of the swing of the rock arms 41. In contrast, in the conventional technique, one end of the locating bolt is slidably connected in the slide slot. In comparison with the conventional technique, the locating bodies of the present invention can be smoothly moved to avoid wear after a period of use. Therefore, the present invention overcomes the shortcomings of the conventional technique to prolong the lifetime of the end piece 10 of wheel cylinder piston adjustor and enhance the reliability thereof.

The above embodiments are only used to illustrate the present invention, not intended to limit the scope thereof. Many modifications of the above embodiments can be made without departing from the spirit of the present invention.

What is claimed is:

1. An end piece of wheel cylinder piston adjustor, comprising:
   a seat section;
   a guide section disposed on the seat section, the guide section having a linearly extending guide slot; and
   a locating section having a locating body extending through the guide slot and a rock arm, one end of the rock arm being connected with the locating body, the other end of the rock arm being pivotally connected with the seat section via a pivot pin, whereby the rock arm is rotatable around the pivot pin to drive the locating body to synchronously move within the guide slot.

2. The end piece of wheel cylinder piston adjustor as claimed in claim 1, wherein the number of the guide slots is two.

3. The end piece of wheel cylinder piston adjustor as claimed in claim 2, wherein the guide slots are formed on the guide body at an angular interval of 180 degrees.

4. The end piece of wheel cylinder piston adjustor as claimed in claim 2, wherein the number of the locating bodies is two and the number of the rock arms is also two, the locating bodies respectively extending through the guide slots, one end of the rock arms being respectively connected with the corresponding locating bodies.

5. The end piece of wheel cylinder piston adjustor as claimed in claim 1, wherein the seat section has a move space and a rotary body is received in the move space, the other end of the rock arm being pivotally connected with the rotary body.

6. The end piece of wheel cylinder piston adjustor as claimed in claim 5, wherein the seat section includes a plate-shaped seat body, a plate-shaped guide body being connected with the seat body to define the move space between the seat body and the guide body for rotatably receiving the rotary body therein.

7. The end piece of wheel cylinder piston adjustor as claimed in claim 6, wherein the guide slots are formed on the guide body in communication with the move space.

8. The end piece of wheel cylinder piston adjustor as claimed in claim 6, wherein the rock arms are positioned between the rotary body and the guide body.

9. The end piece of wheel cylinder piston adjustor as claimed in claim 5, wherein the rotary body has the form of a plate body.

10. The end piece of wheel cylinder piston adjustor as claimed in claim 5, wherein the seat section has an engagement hole formed through the curvature center of the rotary body.

* * * * *